Figure 1:
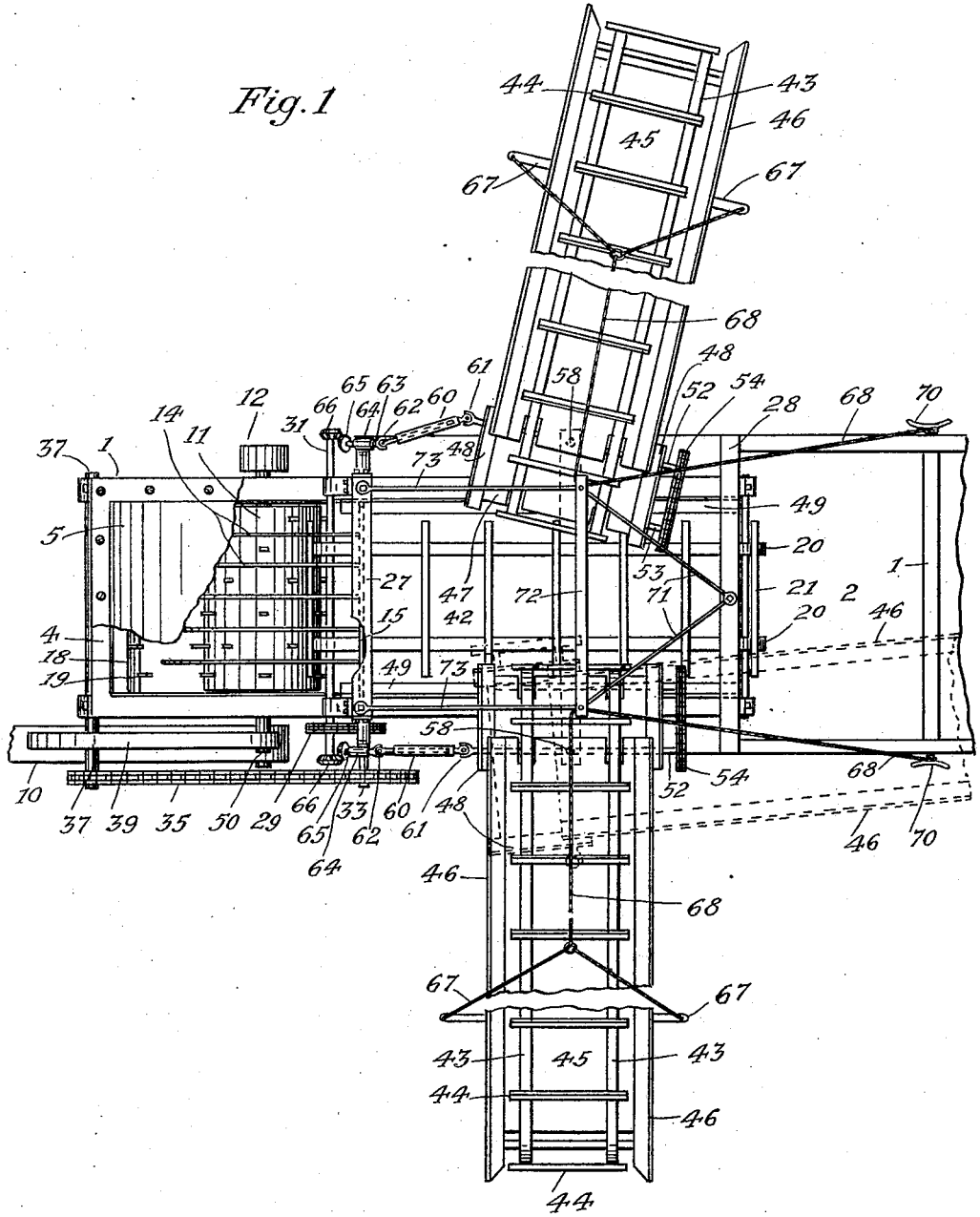

W. WEIS.
BAND CUTTER AND FEEDER.
APPLICATION FILED MAY 3, 1909.

934,490.

Patented Sept. 21, 1909.
3 SHEETS—SHEET 2.

Witnesses:
Theo. Lagaard
H. G. Bowman

Inventor:
William Weis.
By P. H. Gunckel
his Attorney.

W. WEIS.
BAND CUTTER AND FEEDER.
APPLICATION FILED MAY 3, 1909.

934,490.

Patented Sept. 21, 1909.
3 SHEETS—SHEET 3.

Witnesses:
Theo. Lagaard
H. A. Bowman

Inventor:
William Weis.
By P. H. Gunckel
his Attorney.

UNITED STATES PATENT OFFICE.

WILLIAM WEIS, OF PERHAM, MINNESOTA.

BAND-CUTTER AND FEEDER.

934,490.

Specification of Letters Patent. Patented Sept. 21, 1909.

Application filed May 3, 1909. Serial No. 493,466.

*To all whom it may concern:*

Be it known that I, WILLIAM WEIS, a citizen of the United States, residing at Perham, in the county of Ottertail and State of Minnesota, have invented certain new and useful Improvements in Band-Cutters and Feeders, of which the following is a specification.

My invention relates to threshing machines, and particularly to the means for feeding the sheaves, cutting the bands, and delivering the loosened stalks to the threshing cylinder.

Important objects of the invention are the arrangement of the adjustable bundle-carrying devices in rear of the threshing cylinder, that is, to the right of the cylinder shown in the drawings and between it and the discharging end of the machine, instead of the front that is, to the left of the cylinder and outside of the main frame shown, as is customary; and improvement of the self-feeding and band-cutting devices.

My improvements are illustrated in the accompanying drawings, in which—

Figure 2:
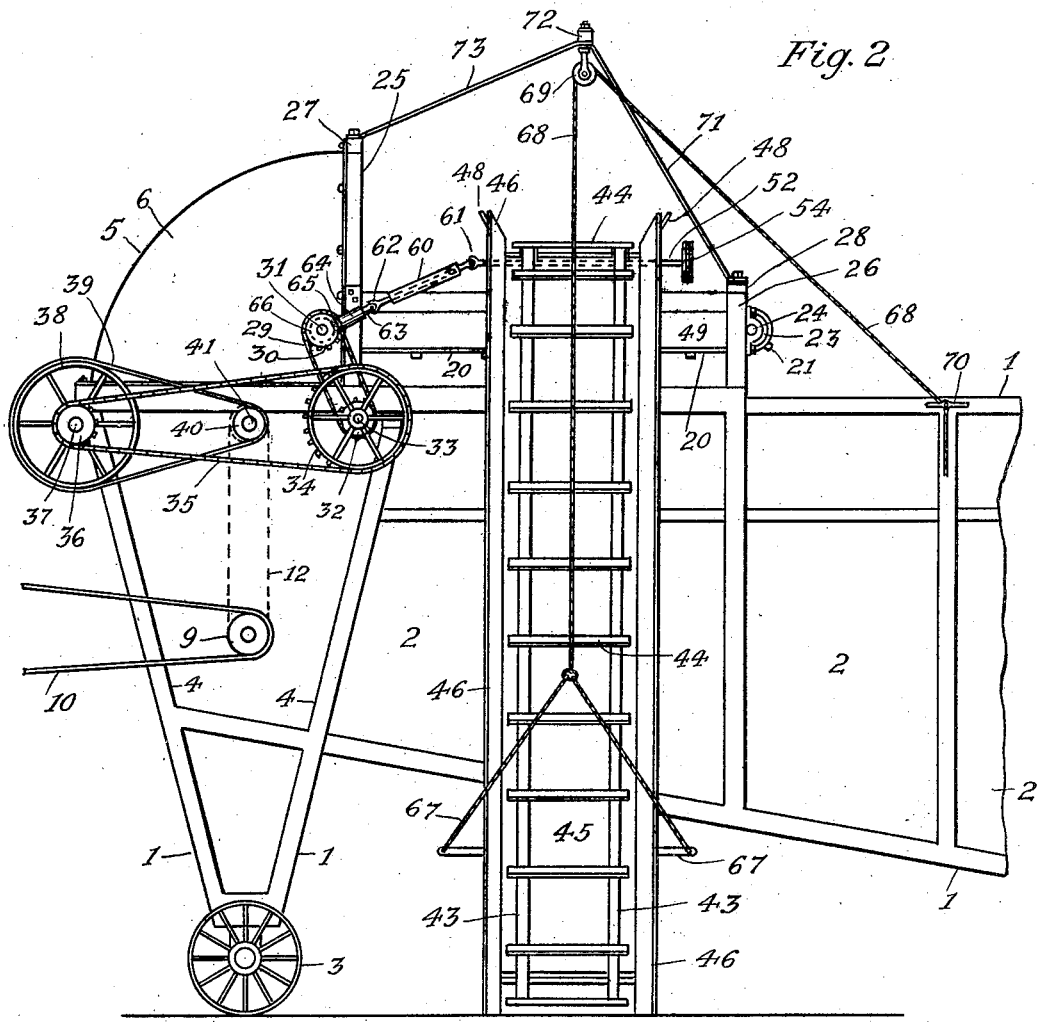
Figure 3:
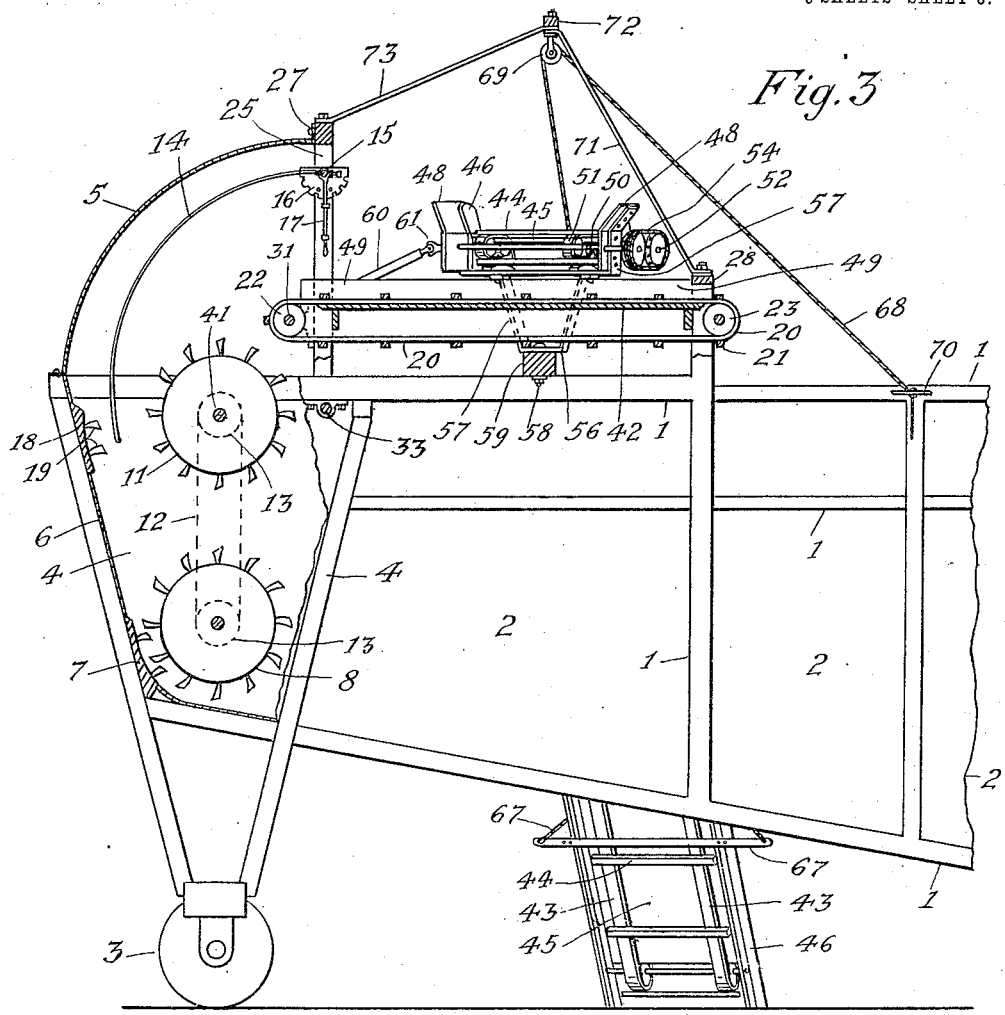
Figure 4:
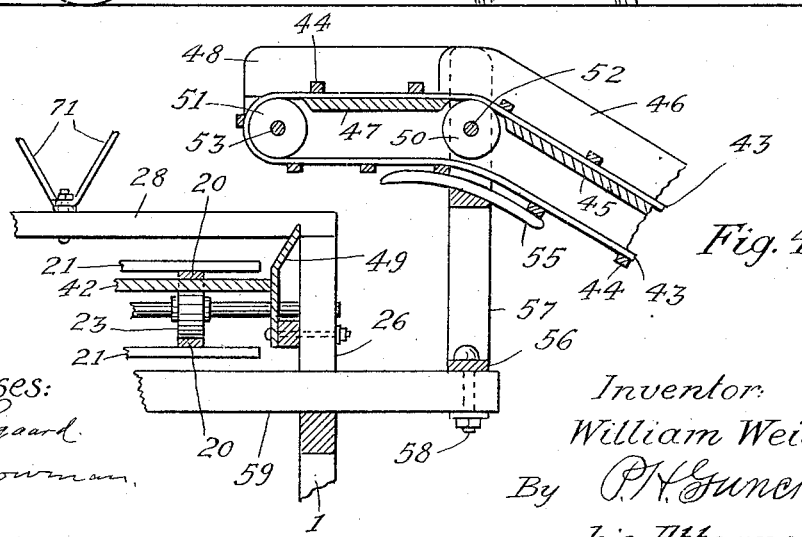

Figure 1 is a plan view of the forward portion of a threshing machine embodying my improvements. Fig. 2 is a side elevation of the same. Fig. 3 is a central vertical section of the same portion of the machine. And Fig. 4 is an enlarged transverse sectional view showing portions of the bundle-carrier and feeding devices.

In the drawings 1 designates the framework, 2 the housing, and 3 one of the front wheels; 4 designates the feed-box portion of the frame, 5 a hood thereon, 6 the casing for the top and front of the feed-box, 7 the toothed concave, and 8 the threshing cylinder. The latter is driven, as usual, by means of a pulley 9 and belt 10.

The band-cutter 11 is located above the cylinder and rotated in the same direction by a belt 12 connecting pulleys 13 on the shafts of the cylinder and band-cutter. As to the form of the band-cutter I prefer to use a toothed cylinder similar in construction to the threshing cylinder 8, but, of course, do not wish to limit myself to that precise form. A device of the kind suggested serves not merely to cut the bands, but acts as an efficient feeder of the material to the cylinder.

For holding the sheaves to proper contact with the cutter when delivered to the feed-box I employ a series of spring arms 14 carried by a transverse bar 15 above the cutter and extending in forward direction and curved downward in front of the cutter. The bar 15 can be turned on its axis to vary the distance of the free ends of the arms from the cutter, and a fixed notched plate 16 that is engaged by a dog 17 enables the bar to be locked in adjusted positions. To retard the descent of the sheaves, in order that they may be properly operated upon by the cutter 11, a plate 18 provided with teeth 19 is secured to the inner side of the front of the box 4 about on the horizontal plane of the cutter.

The sheaves are conveyed and delivered to the feed-box by a horizontal endless conveyer composed of belts 20 and transverse slats 21 and arranged above the deck of the machine. The rollers 22 and 23 for the conveyer are journaled in boxes 24 on posts 25 and 26 mounted on the main frame; and the posts of each pair are connected by cross-pieces 27 and 28. This conveyer is driven by means of a chain 29 connecting a sprocket-wheel 30 on the axis 31 of its forward roller with a sprocket-wheel 32 on a transverse shaft 33; and the latter shaft is driven by a sprocket-wheel 34 connected by a chain 35 with a sprocket-wheel 36 on a shaft 37 mounted at the front of the frame and driven by a pulley 38 connected by a belt 39 with a pulley 40 on the axis 41 of the band-cutter. A shelf or support 42 is provided for the working portion of the conveyer to prevent sagging.

The sheaves may be delivered to the conveyer from either or both sides of the machine by endless carriers. For convenience and speed of operation it is found desirable in practice to employ duplicate carriers arranged at opposite sides of the machine, as shown in Fig. 1. These carriers are so constructed and arranged as to be adjustable independently of each other in both vertical and horizontal directions by turning them on their pivotal connections adjacent to the sides of the conveyer.

The carrier may be of ordinary construction and may consist of a pair of endless straps or belts 43 connected by cross-slats 44, and the working portions of the belts are supported on the bottom 45 of a trough, the sides 46 of which have their upper portions flaring. The upper end of this main trough is arranged within the outer end of a short horizontal trough, composed of a bottom 47 and sides 48, which is placed in position to discharge the sheaves onto the conveyer. Guide strips 49 are provided to prevent the sheaves from falling off the sides of the conveyer. The belts 43 are driven by rollers 50 and 51 the shafts 52 and 53 of which carry sprocket-wheels that are operatively connected by a chain 54. The belts 43 are supported beneath the roller 50 by a curved guide 55 to prevent undue sagging.

The shaft 52 is journaled on the upright arms of a pivoted frame composed of a horizontal bar 56 to which are attached the uprights 57, and the bar or base is pivotally connected by a bolt 58 to a cross-piece 59 that is secured above the deck of the machine. The sides 48 of the horizontal trough are secured to the uprights 57, so that that trough will turn with the pivoted frame, and the axis 53 for the roller 51 is journaled in the trough sides 48. By this arrangement both sections of the carrier are made to turn in unison in lateral direction.

The carrier shaft 52 is driven by means of a telescoping shaft 60, to one member of which it is connected by a universal joint 61, the other member being connected by a similar joint 62 to a short shaft 63 journaled in a box 64 on a bracket on the post 25 and provided with a bevel pinion 65 in mesh with a bevel gear 66 on the shaft 31. The telescoping shaft and the universal joints connecting it with the driving connections permit the carrier to be turned and adjusted in vertical and horizontal directions, as will be obvious. For readily accomplishing such movements and adjustments of the carrier the following means are provided. To a sling 67 connected to the carrier near its outer end is attached a cable 68 which runs over a pulley 69, supported at a proper height above the machine, and extends thence rearward and downward. By operating the cable the carrier can be raised or lowered as desired, and can be secured to a cleat 70; and the carrier can be swung by hand laterally on its pivot 58 to whatever extent is desired.

When not in service the carrier can be raised by means of the cable to approximately horizontal position above the deck and swung around toward the rear of the machine and supported thereon, as shown by broken lines in Fig. 1. To permit such movement the rear supports 71 for the pulley 69 are attached to the cross-piece 28 at its middle and extend in angular directions upward and forward to the cross-bar 72 from which the pulley is hung; and the forward supports 73 extend from the tops of the posts 25 in upwardly inclined direction to the ends of the bar 72.

In operation the sheaves are laid upon the lateral carriers, and are thereby conducted and delivered to the longitudinal conveyer, preferably with their heads toward the front of the machine, and the conveyer delivers them into the feed-box. There they are caught by the band-cutter, the bands severed, and the loosened stalks fed gradually downward between the cutter and the yielding arms 14 and toothed surface 18 to the threshing cylinder. As convenience of operation requires the carriers can be lowered or raised and swung forward or rearward to the desired extent. And when not in use the carriers can, if desired, be readily elevated to the top of the machine and turned rearward over the deck, thereby relieving the front portion of the machine of the weight of the bundle-carriers.

Having described my invention, what I claim and desire to secure by Letters Patent is—

1. In a threshing machine, the combination with the feed-box and the cylinder and concave therein, of a band cutter located above and rotating in the same direction as the cylinder and adapted to throw the material toward the front of the feed-box, retarding devices located in front of the cutter and comprising an unyielding toothed body in front of the cutter and intermediate resilient arms for feeding the material to the cylinder, and a conveyer located in rear of the feed-box for delivering the bundles thereto, substantially as set forth.

2. In a threshing machine, the combination with the feed-box and the threshing cylinder and concave therein, of a band-cutter located above the cylinder and rotating in the same direction as the cylinder, retarding devices coöperating therewith comprising an unyielding toothed body in front of the cutter and intermediate resilient arms for feeding the material to the cylinder, and a conveyer located in rear of the feed-box for delivering the bundles thereto, substantially as set forth.

3. In a threshing machine, the combination with the feed-box and the cylinder and concave therein, of a band cutter located above and rotating in the same direction as the cylinder and adapted to throw the material toward the front of the feed-box, retarding devices located in front of the cutter and comprising an unyielding toothed body in front of the cutter and intermediate resilient arms for feeding the material to the cylinder, a conveyer located in rear of the feed-box for delivering the bundles thereto, a carrier for conducting bundles to said conveyer, and driving connections adapting the carrier to be adjusted in horizontal and vertical directions, substantially as set forth.

4. In a threshing machine, the combination with the feed-box and the threshing cylinder and concave therein, of a band-cutter located above the cylinder and rotating in the same direction as the cylinder, retarding devices coöperating therewith comprising an unyielding toothed body in front of the cutter and intermediate resilient arms for feeding the material to the cylinder, a conveyer located in rear of the feed-box for delivering the bundles thereto, and a carrier for conducting the bundles to such conveyer and consisting of a laterally movable horizontal inner section overhanging said conveyer and a vertically movable outer section connected to the inner section, whereby both carrier sections are adjustable in lateral direction and the outer section is also independently adjustable in vertical direction, substantially as set forth.

In testimony whereof I have signed my name to this specification in the presence of two subscribing witnesses this 17th day of April, 1909.

WILLIAM WEIS.

Witnesses:
  H. F. Thoelke,
  Albert G. Henn.